United States Patent [19]

Harmstorf

[11] Patent Number: 4,721,409
[45] Date of Patent: Jan. 26, 1988

[54] METHOD AND DEVICE FOR PROGRESSIVELY PRODUCING AN UNDERWATER LAYING-OUT CHANNEL

[76] Inventor: Rudolf Harmstorf, Stauffenbergstrasse 6m, 2000 Hamburg 55, Fed. Rep. of Germany

[21] Appl. No.: 872,541

[22] Filed: Jun. 10, 1986

[51] Int. Cl.$^4$ .............. F16L 1/04; E02F 5/02
[52] U.S. Cl. ................. 405/163; 405/158; 405/159; 37/63
[58] Field of Search ........... 405/154, 174, 175, 180, 405/181, 182, 183, 159, 160, 161, 162, 163, 164; 37/56, 62, 63, 64, 77

[56] References Cited

U.S. PATENT DOCUMENTS

| | | | |
|---|---|---|---|
| 3,004,392 | 10/1961 | Symmank | 405/163 |
| 3,333,432 | 8/1967 | Hale et al. | 405/164 |
| 3,638,439 | 2/1972 | Niederer | 405/159 |
| 4,043,135 | 8/1977 | Hoes et al. | 405/174 |
| 4,295,757 | 10/1981 | Gaspar | 405/164 |
| 4,326,347 | 4/1982 | Ballinger | 405/180 |
| 4,362,436 | 12/1982 | Harmstorf | 405/161 |
| 4,586,850 | 5/1986 | Norman et al. | 405/163 |

FOREIGN PATENT DOCUMENTS

| | | | |
|---|---|---|---|
| 705470 | 4/1941 | Fed. Rep. of Germany | 405/163 |
| 1171968 | 3/1961 | Fed. Rep. of Germany | . |
| 1484692 | 6/1964 | Fed. Rep. of Germany | . |
| 2922410C2 | 6/1979 | Fed. Rep. of Germany | . |
| 0819278 | 4/1981 | U.S.S.R. | 405/180 |

Primary Examiner—Dennis L. Taylor
Attorney, Agent, or Firm—Harness, Dickey & Pierce

[57] ABSTRACT

A method for progressively producing an underwater laying-out channel (3) for an object (53) to be laid out, like a cable or the like, in an underwater ground by flushing and by mechanically loosening ground formations (7) which are resistive against flushing, by means of a mechanical loosening device (31) having a given maximum working depth, characterized by lowering the mechanical loosening device (31) to the ground formation (7) which is resistive against flushing, and advancing, in an advancing direction, the mechanical loosening device through the ground information which is resistive against flushing, with the working depth being effective from the surface of that ground formation.

5 Claims, 1 Drawing Figure

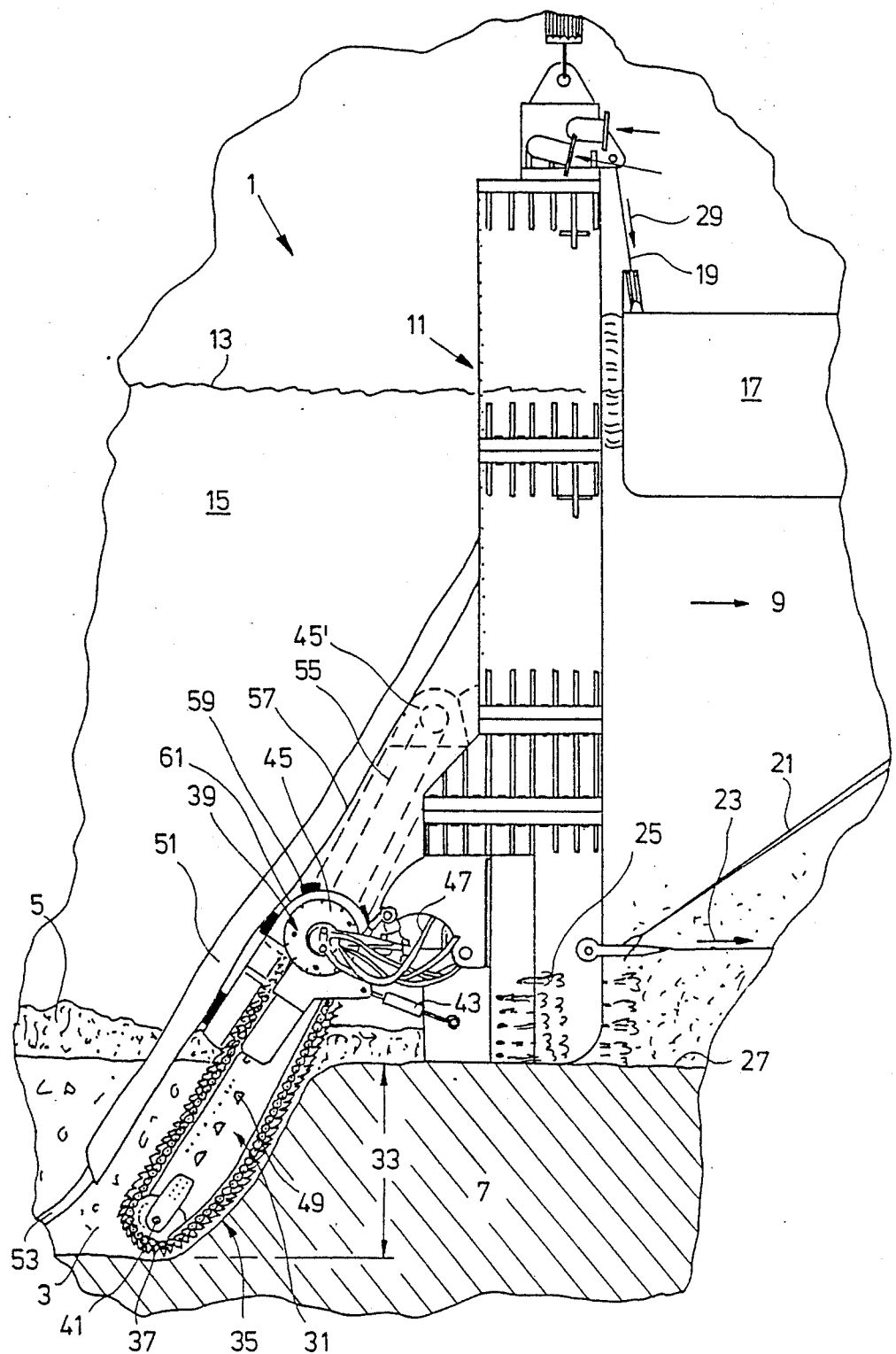

METHOD AND DEVICE FOR PROGRESSIVELY PRODUCING AN UNDERWATER LAYING-OUT CHANNEL

The invention relates to a method for progressively producing an underwater laying-out channel for an object to be laid out, like a cable or the like, in an underwater ground by flushing and by mechanically loosening ground formations which are resistive against flushing, by means of a mechanical loosening device having a given maximum working depth.

The invention furthermore relates to an apparatus for performing the method, the apparatus comprising a flushing device, like a flushing colter, movable through flushable ground areas of the underwater ground, and a mechanical loosening device for loosening ground formations which are resistive against flushing.

In prior art methods and apparatuses of the kind indicated, the flushing and the mechanical loosening proceed from a base, for instance an embedding vehicle which is progressively advanced on the underwater ground (German patent letter No. 29 22 410). It is furthermore known to provide mechanically acting ripping teeth or the like at the front side of a flushing colter (German disclosure letter No. 14 84 692, German publication letter No. 11 71 968). Furthermore, also apparatuses are known, of course, which comprise only a flushing device or only a mechanical loosening device (prospectus of the company Simec Z. I. La Malle, Bouc Bel Air, France, printing mark IPS 13160). Although the known methods and devices operate satisfactorily in many cases of application, it has occurred that in the case of underwater grounds in which flushable ground formations alternate with ground formations which are resistive against flushing, the produced laying-out channel did not permit a sufficiently deep embedding of the laid-out object, and cables laid out in accordance with such methods became damaged by ship anchors although a sufficient laying out depth had been projected.

It is the object of the present invention to provide a method and a device by which the produced laying-out channel ensures an always sufficiently deep embedding of the object into ground formations which are resistive against mechanical impacts, for instance by ship anchors.

According to the invention, that object is attained by a method as initially set forth, which is characterized by the steps of lowering the mechanical loosening device to the ground formation which is resistive against flushing, and advancing, in an advancing direction, the mechanical loosening device through the ground formation which is resistive against flushing, with the working depth being effective from the surface of that ground formation.

According to the invention, the object stated is also attained by an apparatus as initially set forth, which is characterized in that the mechanical loosening device is arranged in the lower end area of the flushing device.

According to the invention, the working depth of the mechanical loosening device is counted only from the maximum flushing depth obtainable, whereby the working depth achieved with the mechanical loosening device is completely available as a protection depth in a mechanically solid ground formation. This advantageous effect is achieved with means of utmost simplicity; neither particularly intricate method steps nor complicated mechanical devices are required. According to the invention, the flushing device acts, so to speak, as a probe which guides the mechanical loosening device along on the non-flushable solid ground formation, whereby the working depth of the mechanical loosening device becomes fully effective in that solid ground formation.

In order that the upper limit of the non-flushable solid ground formation be not blurred, it is appropriate that the loosening is performed in a rear section of the flushing area, in the sense of the advancing direction, and a forward section of the flushing area remains free of the influence of the mechanical loosening device. Accordingly, it is appropriate to arrange the mechanical loosening device in a rear section of the flushing area produceable by the flushing device. Then, the effect of the loosening device can be even supplemented by an additional flushing in the area where the loosening device is effective. In doing so, the flushing is preferably done at least partly also with air; thereby, an area of reduced density will form in the range of the loosening device, which facilitates the removal of ground material from the laying-out channel. To this end, the mechanical loosening device can be provided with flushing nozzles for water and/or air. If the loosening device comprises a chain tool, i.e. is designed for instance as a chain milling device or the like, is appropriate to provide flushing nozzles beneath the chain tool. Thereby, the chain tool is more effectively rinsed free of the loosened material.

It is readily possible to lay the object to be laid out into the laying-out channel during the production of the laying-out channel; that mode of operation, of course, is particularly time-saving. Then, the device contains laying-out devices for laying out the object during the production of the laying-out channel. Those laying-out devices can be designed in the usual manner, for instance with a gradually curved cable guide, with the object, for instance a cable, being guided therethrough.

Appropriately, the mechanical loosening device is arranged pivotally to enable a setting of its working depth conveniently and at little expense.

Furthermore, it is advantageous if the mechanical loosening device is drivable from a driving motor arranged above the flushable area of the underwater ground, appropriately via a chain which is provided in a protective housing which is sealed against the surrounding water. Thereby, also drive motors can be employed which are very large and would, in flushable ground areas, for instance loose sand, create a very high resistance against the advancement of the apparatus.

The invention will be subsequently described by means of an embodiment example in connection with the drawing.

The drawing is a diagrammatic illustration in the manner of a lateral view, partly in section, of an apparatus according to the invention.

The FIGURE shows an embodiment of the apparatus according to the invention during a progressive production of a laying-out channel 3 in an underwater ground which comprises a flushable cover layer 5, for instance of sand, and therebelow a ground formation 7 which is resistive against flushing. The apparatus works in the advancing direction 9 shown. The apparatus contains a flushing device 11 in the form of a flushing colter which can be designed in the usual manner and is hung via ropes 19, 21 on a vessel 17 swimming on the surface 13 of the water body 15, and which is put under the action of a pulling force 23 by means of a driving device not illustrated. The flushing device 11 comprises in its lower area, up to a level which approximately corresponds to the maximum height to be expected of the flushable cover layer 5, an arrangement of flushing nozzles 25 from which pressurized water and/or air are ejected in the usual manner to stir up the flushable cover layer 5 so that the flushing device 11 can pass therethrough. Naturally, the flushing device 11 can sink down only as far as the flushable cover layer 5 extends. Thus, the flushing device 11 rides with its lower end on the surface 27 of the non-flushable ground formation 7 and is pulled onwards on that surface. The flushing device 11 is put under a downwardly acting force 29 in the usual manner from the vessel 17 via the rope 19.

In the lower end area of the flushing device 11, a mechanical loosening device 31 is provided and is effective across an adjustable working depth 33 in the non-flushable ground formation 7. In the illustrated embodiment, the loosening device comprises as an essential constituent a chain milling device 35 having a chain tool 37 which travels around over an upper deflection area 39 and a lower deflection area 41. In order that the working depth 33 of the mechanical loosening device 31 is adjustable, the loosening device is arranged pivotally at the flushing device 11; in the illustrated embodiment, the loosening device is pivotable by means of a hydraulic cylinder 43 about the upper deflection area 39. In the illustrated embodiment, the loosening device 31 is driven by means of a hydraulic motor 45 which is arranged in the upper deflection area 39. The hydraulic conduits 47 for the hydraulic cylinder 43 and the hydraulic drive motor 45 extend through the flushing device 11 to a power station not illustrated.

The mechanical loosening device 31 must not impede the probe function of the flushing device 11 for detecting the surface 27 of the non-flushable ground formation 7. Therefore, the loosening device 31 is arranged, as illustrated, so that it is provided only in a rear section of the flushing area produced by the flushing device 11. Because of that distance between the loosening device 31 and the flushing device 11, flushing nozzles 49 for water and/or air can be provided at the loosening device 31 to supplement the removal of ground material from the laying-out channel 3. Air nozzles show a particularly favourable action because they produce a zone of reduced density in which the excavated material is flushed upwards particularly easily.

In the illustrated embodiment, the flushing nozzles 49 are arranged beneath the upper run of the chain tool 37. This will facilitate the removal of the excavated material from the chain tool 37.

The illustrated embodiment has laying-out devices 51, as here indicated in the form of a cable guide, for laying out the object 53, for instance a cable, during the production of the laying-out channel 3. These laying-out devices, however, can be dispensed with or left unused if only the laying-out channel 3 shall be produced with the apparatus, and the object 53 shall be laid into the channel only at a later time, when a simple flushing operation will be sufficient because then, loose material at best may have settled in the laying-out channel 3, which can be removed by flushing.

In the illustrated embodiment, a possibility is indicated in hatched lines which offers advantages when using very strong and voluminous drive motors. Operating loosening device 31 may require considerable power which in turn requires a correspondingly large and heavy hydraulic drive motor, or a plurality of drive motors. If those motors are arranged in a relatively deep area, for instance as illustrated in the area where the flushing nozzles 25 of the flushing device 11 are effective, and if the motor has large dimensions, a considerable power may be necessary to advance the motor in the advancing direction 9 through the stirred-up cover layer 5. It may then be more favourable, as illustrated in hatched lines, to arrange the drive motor 45' above the flushable area of the water body 15, and to couple it with the loosening device 31 via power transmission means which require little space and do not cause an excessive resistance against the advancing of the apparatus. The embodiment which is indicated in hatched lines, has a chain 55 as a power transmission means, which is provided in a protective housing 57 which is sealed against the surrounding water. The lower end of the protective housing sits movably, via slipring seals 59, on a hood 61 which is coaxial with the pivot axis of the loosening device 31 so that the pivoting of the loosening device 31 will be not impeded.

I claim:

1. A method for progressively producing an underwater channel in which an object such as a cable or the like is to be laid out and buried in an underwater ground comprised of a base layer of a formation solid enough to resist the formation of a channel by a flushing operation and requiring a mechanical loosening operation to form the channel, said method being characterized by the steps of lowering the mechanical loosening device through the water and any layers overlying the base layer to the base layer, supporting the mechanical loosening device upon the base layer and below any ground formation that is not resistive against flushing, and advancing the mechanical loosening device through the base layer and operating the mechanical loosening device for forming a channel in the base layer to a depth that extends downwardly from the upper surface of the base layer and effecting a flushing operation above the upper surface of the base layer for removing any layers above the base layer in the area of the channel.

2. The method according to claim 1, characterized by performing the mechanical loosening in a rear section relative to the direction of advance and flushing forwardly of the section of the mechanical loosening device.

3. The method according to claim 2, characterized by performing an additional flushing the area in which the mechanical loosening device operates.

4. The method according to claim 3, characterized by performing the additional flushing at least partly with air.

5. The method according to claim 1, characterized by laying the object out into the laying-out channel during the production of the laying-out channel.

* * * * *